Dec. 31, 1968  J. MAZZARINS  3,419,316
TRACK SHOE ASSEMBLY
Filed April 27, 1967

INVENTOR.
Janis Mazzarins
BY
C. J. Bishop
ATTORNEY

United States Patent Office 3,419,316
Patented Dec. 31, 1968

3,419,316
TRACK SHOE ASSEMBLY
Janis Mazzarins, Macedonia, Ohio, assignor to General Motors Corporation, Detroit, Mich., a corporation of Delaware
Filed Apr. 27, 1967, Ser. No. 634,319
6 Claims. (Cl. 305—54)

ABSTRACT OF THE DISCLOSURE

A locking arrangement for securing a track shoe to the links of an endless track chain. The locking arrangement is characterized by employing a lock member which threadably receives the threaded ends of a pair of track shoe retaining bolts and includes a dowel that extends into the shoe for absorbing shear forces.

---

The endless track chain of a crawler tractor is composed of a plurality of laterally spaced links interconnected by transversely extending pin members. Spanning each pair of laterally aligned links is a track shoe having the usual grouser that serves to dig into the soil and provide traction as the tractor is driven. The track shoe is typically secured to the links by bolts having nuts that are sufficiently torqued so as to draw the shoe into frictional engagement with the links and thereby relieve the bolts from excessive shear forces. One difficulty, however, with this manner of fastening the shoe to the links is that, after a certain amount of use, shock loads cause the nuts to work themselves loose resulting in a loss of the required frictional restraint which safeguards the bolts from the aforementioned shear forces. Another problem has been the stress concentrations created at the seat of the individual nuts. Frequently, the opening in the track has a machined recess of rectangular or other polygonal cross section corresponding to the shape of the nut used so that the latter can be self-positioned and non-rotatably retained therein. In such cases, the nut retaining recess has sharp corners whereat stress concentrations build up which increase the probability of track breakage.

Accordingly, the objects of the present invention are to provide a locking arrangement which secures a track shoe to the track links and substantially eliminates stress concentrations in the links; to provide a track shoe lock means in which the threaded ends of the bolts are tied together through a common member which is not susceptible to working loose during the track operation; to provide a track shoe assembly having a track securing means which includes a dowel for absorbing shear forces; and to provide a T-shaped lock member for a track shoe that joins the threaded ends of the bolts and has a portion that extends into the track shoe for absorbing the shear forces which would normally be applied to the bolts.

Other objects and advantages of the present invention will be more apparent from a reading of the detailed description when taken with the accompanying drawing in which.

Figure 1:
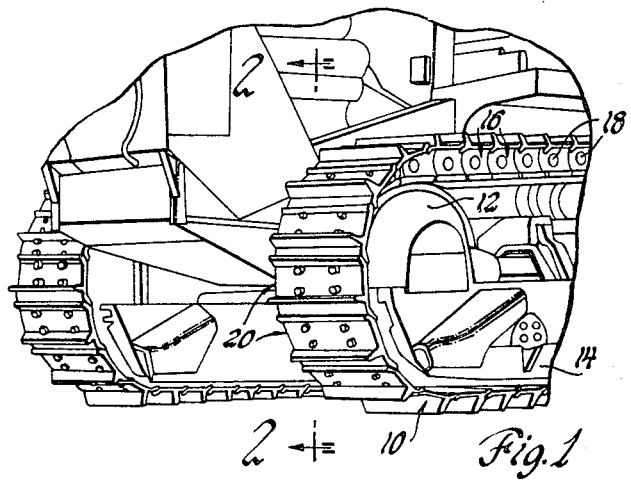
FIGURE 1 is a perspective view showing a portion of the front end of a crawler tractor having a track chain incorporating the present invention.

Referring now to the drawing and more particularly FIGURE 1 thereof, the front end of a crawler tractor is shown having the usual endless track chain 10 entrained about an idler wheel 12, roller frame 14 and drive sprocket (not shown). The track chain 10 consists of a plurality of identically formed and laterally spaced links 16 interconnected by transversely extended pins 18 which provide hinged connections permitting the chain to articulate as it moves about the idler wheel and drive sprocket of the tractor.

Figure 3:
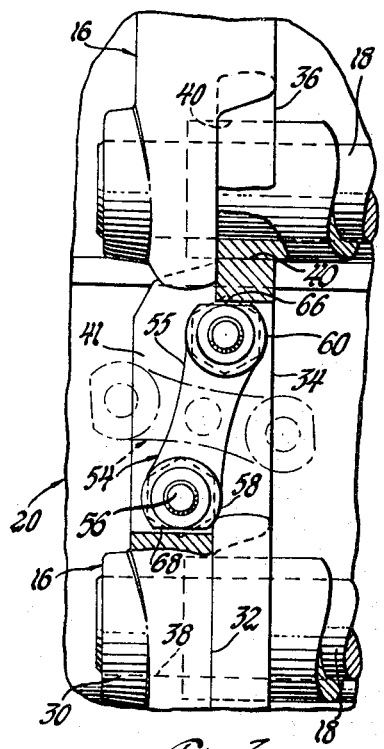
FIGURE 3 is a view taken on line 3—3 of FIGURE 2.
Figure 2:
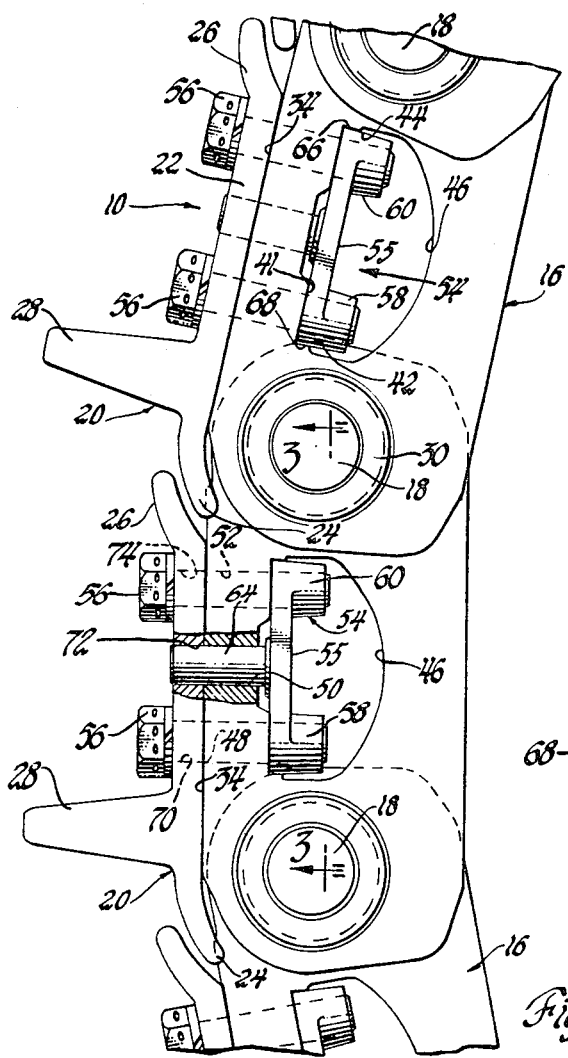
FIGURE 2 is an enlarged elevation view of a portion of the track chain taken on line 2—2 of FIGURE 1 and showing the track shoes fastened to the links in accordance with the present invention.
Figure 4:
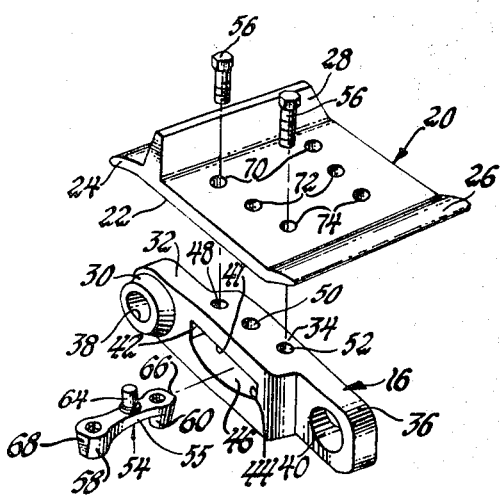
FIGURE 4 is an exploded view of a track shoe locking arrangement seen in FIGURES 3 and 4.

As best seen in FIGURES 3 and 4, each pair of laterally aligned links 16 supports a track shoe 20 comprising a flat plate portion 22, the opposite ends of which are formed with integral extensions 24 and 26, the former of which is curved downwardly while the latter is curved upwardly so as to provide an overlapping arrangement between adjacent track shoes. Each track shoe 20 is also formed with an integral grouser 28 which extends transversely across the track shoe.

Each pair of laterally aligned links 16 are identical in construction as aforementioned, and each link has one end thereof provided with a boss 30 formed with a thin section 32 which merges with an enlarged central section 34 which, in turn, is integrally formed with a section 36 similar to that at the opposite end except for the elimination of the boss. As seen in FIGURE 3, the sections 32 and 36 have openings 38 and 40 formed therein for accommodating the pin 18, and are offset with respect to each other so, as one link 16 is connected to the adjoining link 16 through pin 18, a continuous chain is formed in which the opposite sides of the links are in substantial longitudinal alignment. It will also be noted that each link 16 is formed with an aperture defined by a flat bearing surface 41 and vertical side walls 42 and 44 which lead into a curved wall 46 located opposite the bearing surface. Moreover, three openings 48, 50, and 52 are formed in the section 34 for reasons to be explained below.

Each track shoe 20 is retained by a link 16 through a locking arrangement which consists of a T-shaped lock member 54 and a pair of identical bolts 56. The lock member 54 comprises a cross arm 55 having enlarged bosses 58 and 60 at opposite ends thereof which are bored and tapped for receiving the threaded ends of the bolts 56 in a manner to be described. The cross arm 55 serves as a substantially flat connector, the central portion of which has integrally formed and extending therefrom a dowel pin 64. As seen in FIGURE 3, the opposite ends of the cross arm 55 have flat surfaces 66 and 68 formed thereon which are located adjacent to the vertical walls 42 and 44.

The central portion of the track shoe 20 along each side thereof is provided with three bores 70, 72, 74 adapted to register respectively with the openings 48, 50, 52 formed in the link 16. Thus, when the track shoe is assembled to the link, the bolts 56 are accommodated by the outside bores 70, 74 in the track shoe 20 and openings 48, 52 in the link, and are threadably received by the tapped bores located in the cross arm 55 of the lock member 54. The dowel pin 64 of the lock member 54 passes through the central bore 72 and opening 50 in the link.

The assembly procedure for locking the track shoe 20 to the links 16 is as follows: The lock member 54 is first positioned in the side aperture of the link 16 with the axis of the cross arm 55 extending substantially normal to the longitudinal axis of the link as seen in FIGURE 3. The flat central portion of the cross arm 55 then is permitted to be placed adjacent to the arcuate wall 46 so that the bosses 58 and 60 straddle the opposite sides of the link 16. This permits sufficient clearance for the dowel pin 64 to enter the opening 50 in the link 16 and the registering dowel pocket or bore 72 formed in the track shoe. Thereafter, the lock member 54 is rotated to the full line position and the bolts 56 are placed in the end bores 70, 74, through openings 48, 52, and threaded into the accommodating bores formed in the cross arm 55 of the lock member.

As should be apparent from the above description, the locking arrangement made in accordance with this invention serves to retain the track shoe 20 on the links 16 in a manner which substantially relieves the bolts 56 from shear forces. In this regard, it will be noted that the dowel pin type connections will serve to absorb the usual shear forces occasioned by the tractive effort of the tractor. Another feature of this locking arrangement is that the cross arm 55 of the lock member 54 decreases the probability of high stress concentrations occurring in the link 16 because the cross arm engages a relatively large surface of the link thereby decreasing the unit loading.

I claim:

1. A track shoe assembly comprising a pair of laterally spaced links each of which has a bearing surface formed thereon, a track shoe extending between said links and having a dowel pocket formed therein, means for securing said track shoe to said links, said means including a bolt and a lock member, said lock member threadably receiving said bolt and contacting said bearing surface, a dowel pin formed with said lock member and passing through said link into said dowel pocket for absorbing shear loading on the track shoe.

2. A track shoe assembly comprising a pair of spaced links, each of said links having an aperture formed therein, said aperture having a substantially flat bearing surface, a track shoe extending between said links, means for securing said shoe to each of said links, said means including a pair of bolts and a lock member, said lock member having a pair of threaded bores formed therein for threadably receiving said bolts and engaging said bearing surface along substantially the full length thereof so as to reduce stress concentrations in said link.

3. The track shoe assembly of claim 1 wherein said lock member is T-shaped.

4. The track shoe assembly of claim 3 wherein the cross arm of the T-shaped lock member has a boss formed on opposite ends thereof, and a threaded bore is formed in each of the bosses.

5. The track shoe assembly of claim 4 wherein the dowel pin is secured to the cross arm intermediate said bosses.

6. The track shoe assembly of claim 4 wherein the link has an aperture formed therein, and the portion of the cross arm connecting the bosses is of a reduced cross section so as to permit the lock member to be positioned in the aperture and rotated in a position for accommodating the bolts.

References Cited

UNITED STATES PATENTS

| | | | |
|---|---|---|---|
| 1,630,089 | 5/1927 | Leake | 305—54 X |
| 2,338,550 | 1/1944 | Sloman | 305—54 X |
| 2,393,336 | 1/1946 | Myers | 305—54 |
| 2,883,242 | 4/1959 | Polinak | 305—58 |
| 2,982,585 | 5/1961 | Murtaugh | 305—54 |

RICHARD J. JOHNSON, *Primary Examiner.*